United States Patent [19]
Fies et al.
[11] Patent Number: 4,816,675
[45] Date of Patent: Mar. 28, 1989

[54] QUADRUPOLE MASS FILTER WITH UNBALANCED R.F. VOLTAGE

[75] Inventors: William J. Fies, Portola Valley; Michael S. Story, Los Gatos, both of Calif.
[73] Assignee: Finnigan Corporation, San Jose, Calif.

[21] Appl. No.: 119,224
[22] Filed: Nov. 4, 1987

Related U.S. Application Data

[63] Continuation of Ser. No. 782,512, Oct. 1, 1985, abandoned.

[51] Int. Cl.[4] .......... B01D 59/44
[52] U.S. Cl. .......... 250/282; 250/292
[58] Field of Search .......... 250/281, 282, 290, 292, 250/293

[56] References Cited

U.S. PATENT DOCUMENTS

| | | | |
|---|---|---|---|
| 3,147,445 | 9/1964 | Wuerker et al. | 250/292 |
| 3,321,623 | 5/1967 | Brubaker | 250/292 |
| 3,621,464 | 11/1971 | Bryndza | 250/292 |
| 4,214,158 | 7/1980 | Schmidt | 250/281 |

*Primary Examiner*—Bruce C. Anderson
*Attorney, Agent, or Firm*—Flehr, Hohbach, Test, Albritton & Herbert

[57] ABSTRACT

An unbalanced radio frequency voltage is supplied between two pairs of conductive rods of a quadrupole mass filter of a mass spectrometer system. Means are provided for d.c. voltage polarity reversal for monitoring positive and negative ions. The d.c. voltage is derived by rectification of the radio frequency voltage.

5 Claims, 1 Drawing Sheet

QUADRUPOLE MASS FILTER WITH UNBALANCED R.F. VOLTAGE

This is a continuation of application Ser. No. 782,512, filed Oct. 1, 1985, now abandoned.

TECHNICAL FIELD

This invention relates to a quadrupole mass filter used with mass spectrometers.

BACKGROUND ART

One type of mass spectrometer that is extensively used for qualitative and quantitative analysis of chemicals employs one or more quadrupole mass filters. In such spectrometer systems, quadrupole mass filters incorporating four conductive metal rods are supported on amounts made of an insulating material. The rods are energized by combined direct current (d.c.) and alternating current (a.c.) voltage to achieve selective mass focusing. An example of a mass filter is described in U.S. Pat. No. 4,032,782 entitled "Temperature Stable Multiple Mass Filter and Method Therefo" which issued to the same assignee. The patent discloses a method of maintaining filter stability by thermal matching of the rods and the mounts.

To obtain accurate readings and interpretations of analyses performed by mass spectroscopy, it is highly desirable that the mass peak waveforms obtained by the scans are smooth and not characterized by spurious splits or depressions which affect the spectral quality of the data. In prior art systems, it has been observed that such spurious splits and depressions of the mass peaks occur frequently, thus deleteriously affecting the interpretation of the resulting data.

We have discovered that by unbalancing the r.f. voltages applied to the pairs of quadrupole rods that spurious splits and depressions are substantially reduced.

SUMMARY OF THE INVENTION

An object of this invention is to provide a quadrupole mass filter wherein the mass peaks are smooth and devoid of spurious signals and deformations.

Another object is to provide a quadrupole system that has improved ion transmission and hence sensitivity especially for high mass ions.

In accordance with this invention, a quadrupole mass filter used for mass spectrometry employs radio frequency (r.f.) voltages that are applied to the quadrupole rods so that there is an unbalanced r.f. voltage resultant. To achieve the unbalance, the relative values of the components of a capacitive circuit and/or an inductive circuit which is coupled to the rods are selected to provide the desired unbalanced r.f. voltage to the quadrupole mass filter system. The r.f. voltages are measured and controlled so that a predetermined value of unbalance is achieved.

BRIEF DESCRIPTION OF THE DRAWING

The invention will be described with relation to the sole figure of the drawing which is a schematic circuit and block diagram of the apparatus of this invention.

DESCRIPTION OF THE PREFERRED EMBODIMENT

Figure 1:
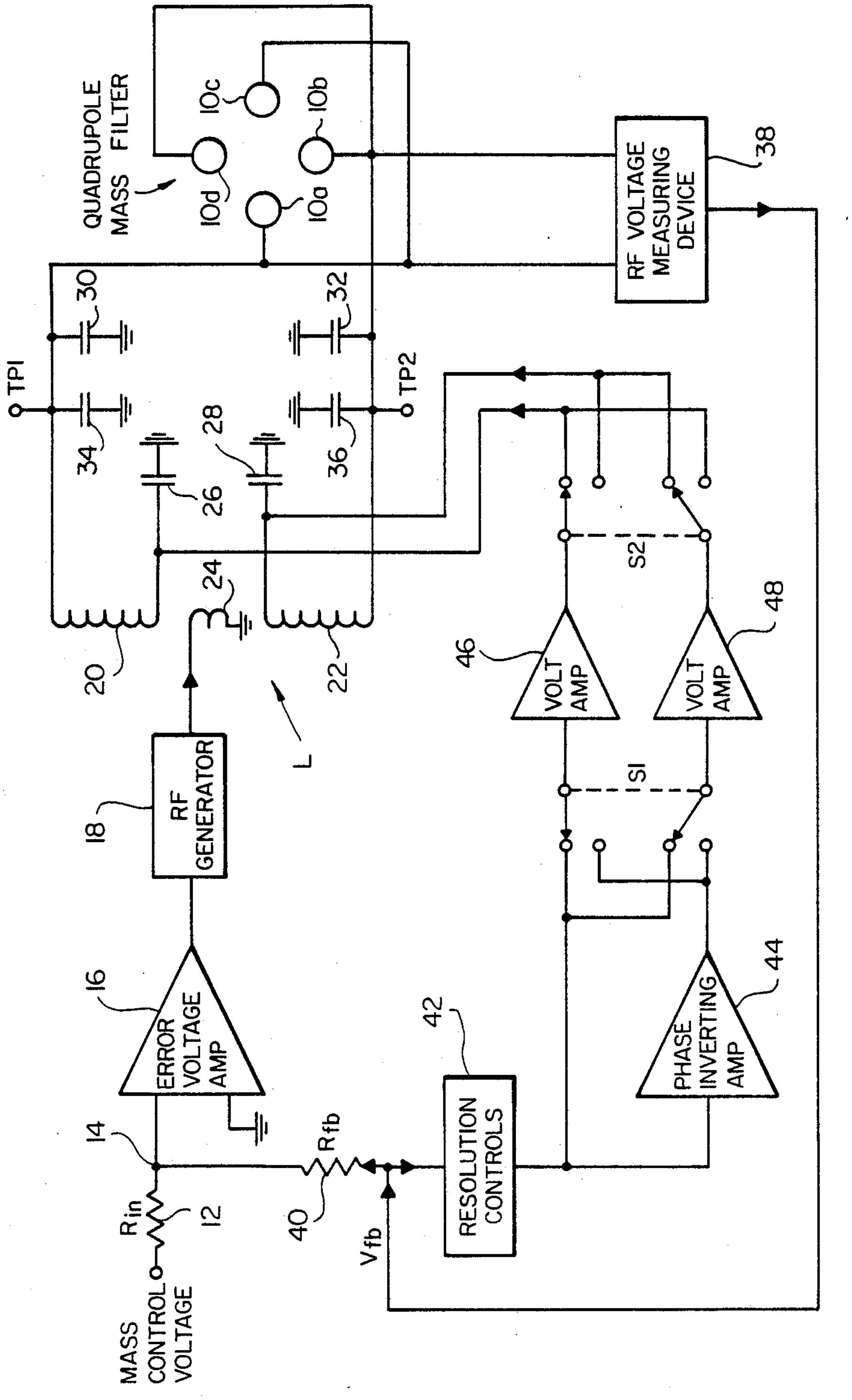

With reference to the drawing, a quadrupole mass filter incorporates two pairs of conductive rods 10a, 10c and 10*b*, 10*d* disposed in a configuration that provides a hyperbolic field through which ions of the material under investigation travel. The rods 10, which may be made of molybdenum, are connected to an electrical circuit that provides d.c. voltage and r.f. or alternating current (a.c.) voltage. The circuit network includes a tuned circuit that controls the magnitudes of the r.f. and d.c. voltages which are applied to the filter rods. The tuned or r.f. resonant circuit is a low loss, high Q circuit, and the phase relation of the r.f. voltage supplied to the two pairs of rods 10*a c* and 10*b*, *d* is substantially 180°. The rods acts to provide a time varying electrostatic field to focus a narrow band of masses.

In operation, a mass control voltage is derived from a control device, such as computer or sweep generator and applied through an input resistor 12 to a summing point 14. The control voltage is used as a reference that sets the mass to which the mass spectrometer will respond. A feedback voltage $V_{fb}$ is obtained from a measuring device 38, which is coupled to the rods 10 and to the tuned circuit, as will be described hereinafter. If a non-zero voltage appears at the summing point 14, this voltage is amplified by an error voltage amplifier 16 and the amplified voltage is fed to the control input of an r.f. generator 18. The r.f. generator 18 supplies an r.f. signal, having a frequency in the range of 1.0–2.0 MHz for example, to the tuned circuit, which comprises an inductive network consisting of inductances 20 and 22 and a capacitive network comprising capacitive elements 34 and 36. A center coil 24, which preferably has one or two turns, is coupled to the output of the generator 18 and is disposed at the center between the two inductances 20 and 22 to supply r.f. power to the tuned circuit.

The capacitive network of the tuned circuit includes the capacitive elements 30 and 32 which represent the capacitances of the wiring, mass filter and cables of the system. The capacitances 34 and 36, which are tied to test points TP1 and TP2, are selected so that the circuit is resonant at the desired frequency of operation, and so that the r.f. voltages measured at the test points TP1 and TP2 have a predetermined unbalance. The capacitances 34 and 36 may be fixed capacitors of selected value or variable capacitors. In either case, the values of the capacitances are such that they meet the requirements of resonance and r.f. unbalance.

Each inductance 20 and 22 is coupled at one end respectively to capacitive elements 26 and 28, which are tied to a reference potential such as ground. The other end of each inductance 20 and 22 is coupled to test points TP1 and TP2 respectively, which are connected to capacitors 34 and 36 respectively. The junction of the inductance 20 and capacitive element 34 is connected to opposing rods 10*a* and 10*c*, whereas the junction of the inductance 22 and capacitive element 36 is connected to opposing rods 10*b* and 10*d*. The inductances and capacitive elements form an LC resonant circuit which provides high r.f. voltage operation, up to 3,000 peak volts for example.

Since the precise values of some of the capacitive elements of the tuned circuit are not known, the need for adjustments of the capacitive values of the tuned circuit to effectuate the r.f. unbalance is determined by an r.f. voltage measuring device such as an oscilloscope. The measuring device is coupled to the test points TP1 and TP2, and to the pairs of rods 10. The capacitors 34 and 36 are adjusted to obtain the desired unbalance. The adjustments may be made manually, or automatically in response to the measurement seen at the measuring device. Alternatively the inductors 20 and 22 may be formed with an unequal or different number of turns on opposite sides of the center tap to produce the desired r.f. voltage unbalance, or may be variable inductances that may be adjusted.

The output feedback $V_{fb}$ of negative polarity from the measuring device 38 represents the difference in r.f. voltage between the rod pair 10*a*, 10*c* and the rod pair 10*b*, 10*d*. This feedback voltage is fed through a feedback resistor 40 to the summing point 14 to be combined with the mass control voltage of positive polarity. As described heretofore, the non-zero sum of the two voltages provides an error signal that is processed by the feedback loop including the tuned circuit and measuring device 38 to compensate for the error and drive the summed voltage at junction 14 towards zero.

The feedback voltage $V_{fb}$ provided by the detector or measuring device 38 is also used to produce the positive and negative d.c. voltages which are applied to the rods 10 in order to produce the mass filtering action of the quadrupole. The feedback voltage is fed through a resolution controls circuit 40 which controls the slope and intercept of the d.c. signal, and thus allows for proper adjustment of mass resolution. The d.c. voltage is applied through parallel channels, one of which incorporates a phase inverting amplifier 44, to a d.c. rod polarity reversible switch S1. The switch S1, which is operated manually, or under computer control if so desired, reverses the d.c. voltage polarity to enable detection of positive or negative ions by the quadrupole filter. In actual operation, it is desirable to switch rapidly between positive ion analysis and negative ion analysis, and in such cases computer control is employed The positive and negative d.c. signals are passed respectively through voltage amplifiers 46 and 48, and applied to the junctions between the inductances 22 and 20 and the bypass capacitors 28 and 26, for application through the tuned circuit to the rod pairs 10.

Although the use of the switch S1 at the input of the voltage amplifiers 46 and 48 is a preferable implementation because it does not require switching of high voltage, bipolar d.c. rod voltage amplifiers are required to enable supplying either positive or negative output signals from each amplifier. In an alternative approach, a switch S2 is used at the output of the voltage amplifiers 46 and 48, and each amplifier needs only to supply a single polarity d.c. signal, one positive and the other negative.

With the implementation disclosed herein, the d.c. rod voltages are delivered to the quadrupole rods through the inductive coil structure. In such case, the center tap of coil 24 is isolated from the system ground and the r.f. circuit is completed by use of grounded bypass capacitors 26 and 28 which serve to complete the r.f. circuit while preventing excessive r.f. voltage from reaching the d.c. rod voltage amplifiers 46 and 48.

We have observed that with an unbalance of the r.f. voltages that are applied to the rods, the shapes of the mass peaks become smooth and afford a significant improvement in mass spectroscopy operation, particularly in quantitative analysis of high mass chemicals. There is a clear separation between adjacent mass peaks without the spurious signals that are experienced in prior art systems and affect the accuracy of the spectroscopic readout. To obtain the desired unbalance, one or both of the capacitive elements are adjusted so that they are different in value. Similarly, the inductive elements may be adjusted to a different value, or adjustments both of inductance and capacitance may be made to achieve the required imbalance of r.f. voltages. In a preferred implementation, the r.f. voltage at one pair of rods, say 10*a*, 10*c* is approximately 1.4 times that at other pair of the rods 10*b*, 10*d*.

What is claimed is:

1. The method of operating a quadrupole mass filter of the type including first and second pairs of conducting rods comprising the steps of:

applying a mass control DC voltage to said pairs of rods to generate an electric field between said rods whereby to transmit a narrow band of ion masses therethrough;

applying an RF voltage to each of said pairs of rods; and adjusting the magnitude of the RF voltage applied to one of said pairs of rods so that it is different from that supplied to the other one of said pairs so that a radio frequency voltage unbalance is produced between said pairs of rods to thereby improve the transmission of ions through said mass filter.

2. The method as in claim 1 which includes the additional step of varying said DC voltage to control the masses of ions passing through said quadrupole mass filter.

3. The method of operating a quadrupole mass filter as in claim 1 including the additional step of sensing the RF voltage unbalance and employing said voltage unbalance to control the RF voltages.

4. The method of operating a quadrupole mass filter as in claim 1 or 2 including the step of reversing the polarity of the DC voltage applied to said rods to control the transmission of positive and negative ion masses through said mass filter.

5. The method of operating a quadrupole mass filter as in claim 1 wherein the magnitude of the RF voltage supplied to one of said pairs of rods is up to 1.4 times the RF voltage applied to the other pair of rods.

* * * * *